(No Model.)  
J. E. LOWE.  
BICYCLE.

No. 550,629.  
2 Sheets—Sheet 1.  
Patented Dec. 3, 1895.

Witnesses  
Chas. W. Parker.  
Joseph H. Milans.

Inventor  
James E. Lowe  
by Graham Low  
attys.

(No Model.) 2 Sheets—Sheet 2.

J. E. LOWE.
BICYCLE.

No. 550,629. Patented Dec. 3, 1895.

Witnesses
Chas. W. Parker.
Joseph H. Milans.

Inventor, James E. Lowe
by Graham & Low Attys

UNITED STATES PATENT OFFICE.

JAMES E. LOWE, OF NORFOLK, VIRGINIA.

BICYCLE.

SPECIFICATION forming part of Letters Patent No. 550,629, dated December 3, 1895.

Application filed May 19, 1894. Serial No. 511,827. (No model.)

*To all whom it may concern:*

Be it known that I, JAMES E. LOWE, a citizen of the United States of America, residing at Norfolk, in the county of Norfolk and State of Virginia, have invented certain new and useful Improvements in Bicycles, of which the following is a specification.

My present invention relates to that class of bicycles known as "safeties," in which the power applied to the cranks is transmitted to the rear or driving wheel by means of a chain running on a driving-sprocket on the crank-shaft and engaging a second sprocket on the hub of the driving-wheel.

My invention has for its object to so improve and construct a bicycle that it can be used as the ordinary or "roadster" wheel, and can, with very little labor and loss of time, be converted into a "racer," in which latter class of bicycles it is highly desirable or necessary that the drive-wheel should receive a greater number of revolutions to one turn of the cranks than in the former class.

It has for a further object to provide a device for effecting this change quickly and easily without the employment of tools or elements not carried by the improved bicycle.

These objects I accomplish by providing the hub of the rear or driving wheel with two sprockets, one of larger diameter than the other, and so mounting the journal of the crank-shaft on the frame of the machine that it is capable of being moved (carrying with it the cranks and driving-sprockets) toward or from the said sprockets, so that the chain can be shifted from one to the other of sprockets on the drive-wheel hub. When the chain is adjusted on the proper sprocket, the crank-shaft journal is moved until the chain is sufficiently taut, when it is locked in such position by means to be hereinafter more particularly described.

In the accompanying drawings I have shown means for carrying my invention into practical effect, without, however, limiting my improvements in their useful applications to the particular construction which, for the sake of illustration, I have delineated.

Figure 1:
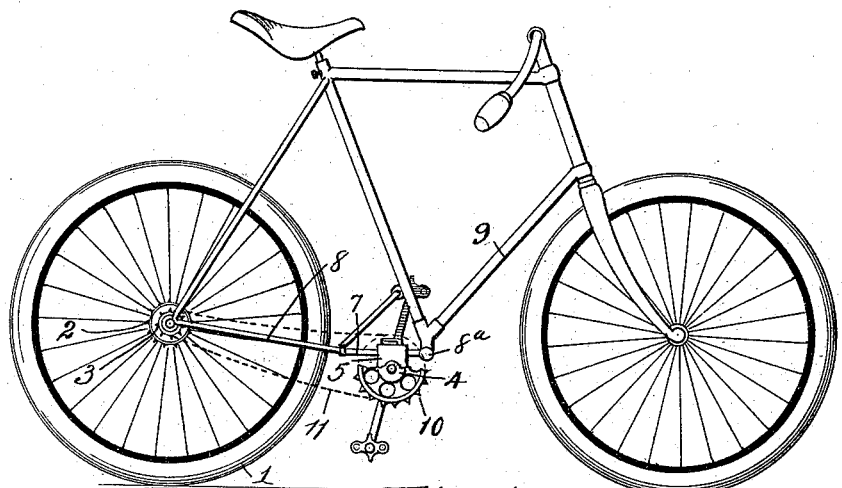
Figure 2:
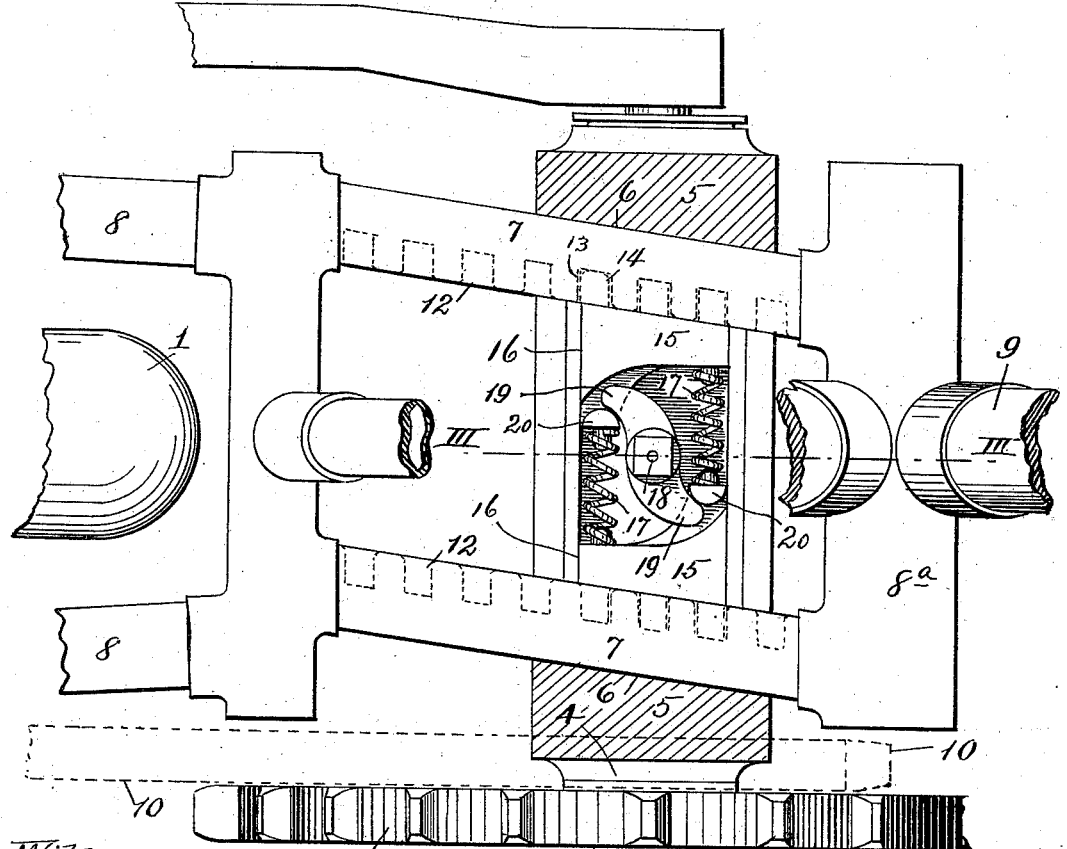
Figure 3:
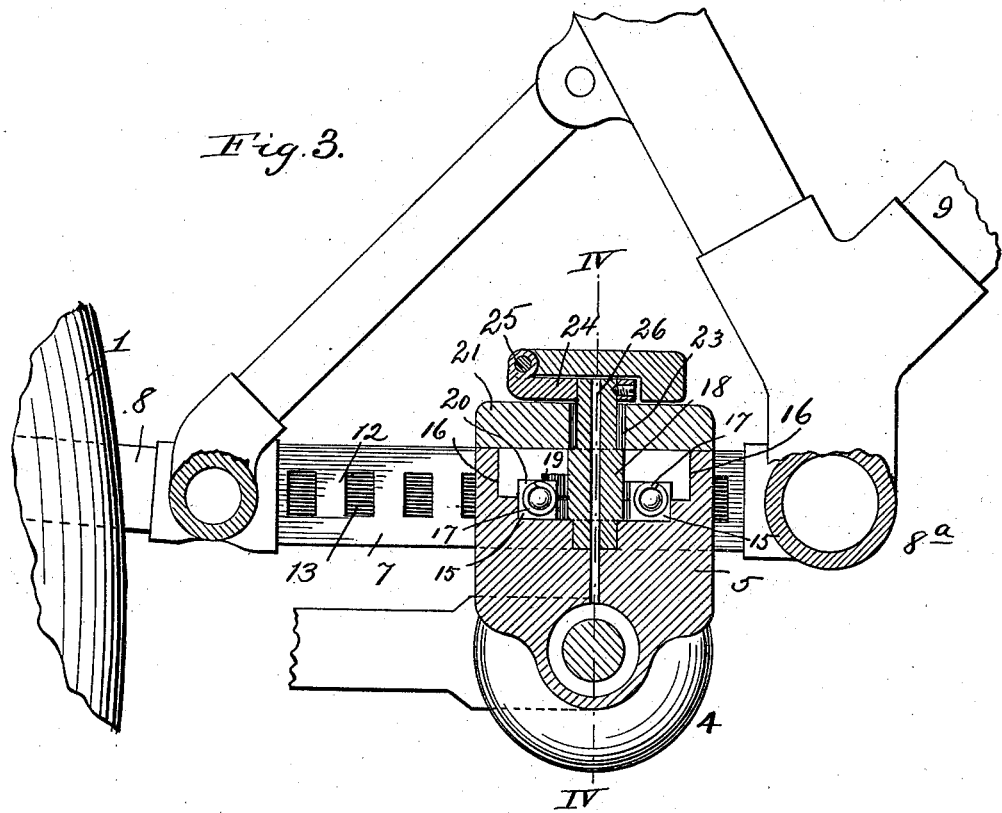
Figure 4:
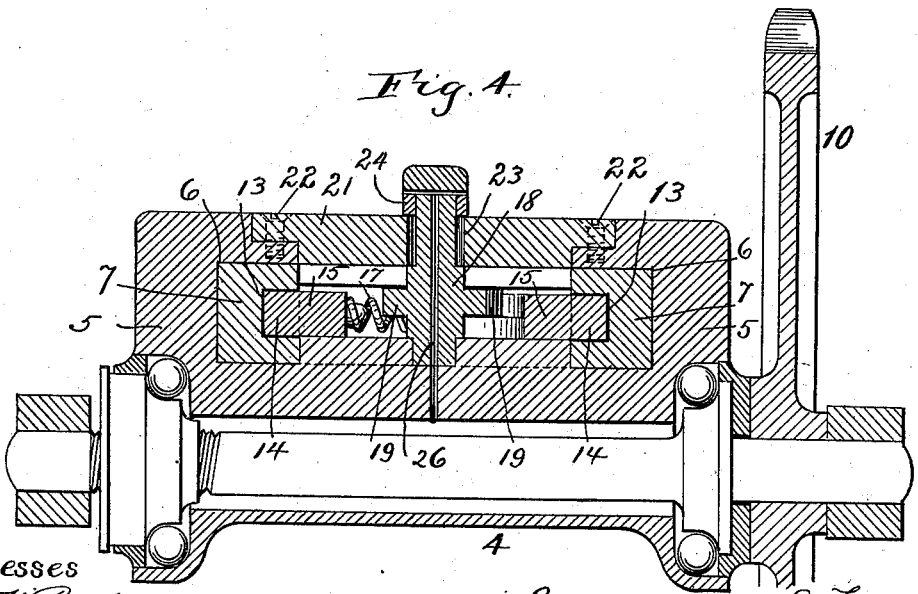

In said drawings, Figure 1 is an elevation of so much of a bicycle provided with my improvements as is necessary to an understanding of the invention. Fig. 2 is a plan view, on a larger scale, of the crank-shaft and neighboring parts, portions of the bicycle being removed. Fig. 3 is a sectional view on line III III of Fig. 2. Fig. 4 is a sectional view on line IV IV of Fig. 3.

In said drawings, 1 indicates the main drive or rear wheel of the bicycle, which is mounted in the usual or any preferred manner in the main frame. On the hub of this wheel are secured two sprockets 2 and 3, the sprocket 2 being of a size suitable for the ordinary roadster-wheel and the sprocket 3 being smaller and suitable for high speed on a track, and consequently for racing purposes. These sprockets may be formed integral with each other or they may be separately secured to the hub in any preferred manner.

4 represents the bearing for the crank-shaft, which is adjustably mounted on the main frame in a novel manner to be hereinafter described in about the position it occupies in bicycles now on the market. This bearing is provided with or has cast with it an upwardly-extending portion or portions 5, cored or grooved out, as at 6, and adapted to engage guide bars or ways 7 on the main frame and to slide thereon toward or from the rear sprockets 2 and 3. These bars are substantially horizontal and are secured to and preferably between the forks 8 of the rear wheel and a bar 8ª, which latter is attached to the usual brace 9, leading to the steering-head of the bicycle.

The guideways 7 7 are parallel and have a lateral diagonal direction, so as to carry the driving-sprocket as it is adjusted backward into line with the larger sprocket 2 and as it is adjusted forward into line with the smaller sprocket 3, thereby insuring that when the chain 11 is placed on either of the sprockets 2 or 3 and the driving-sprocket 10 is moved to tighten the chain the said sprocket 10 will be in substantially a vertical longitudinal plane with the rear sprocket engaged by the chain.

The next feature of my invention is a means for quickly and efficiently locking the crank-shaft bearing in its adjusted position. To this end I provide the guide-bars 7 with toothed racks 12, which in the construction shown are formed by making notches or recesses 13 in the inner and adjacent faces of the bars 7. These notches 13 are adapted to be engaged by teeth 14 on laterally-sliding pieces or dogs 15, seated and movable in guides or grooves 16, formed in the bearing 4 or portions 5. The teeth 14 are kept normally in engagement with the notches 13 by means of coiled springs 17, situated between and bearing against the opposite ends of the slides 15. Any other well-known form of spring, however, may be employed for this purpose.

18 indicates a vertical stud, pivotally mounted on the upper portion of the bearing 4 between the slides 15. This stud is provided with arms 19 engaging ears or projections 20 on the slides 15 and adapted to draw the latter inward or toward each other when the stud is turned in one direction, thus causing the teeth 14 to leave the notches 13 and permit the bearing 4 with parts carried thereby to be adjusted on the bars 7. This locking mechanism I prefer to incase or inclose as a protection from dust and dirt and to improve the appearance of the machine. I therefore provide a plate or top piece 21, which may be secured to the bearing 4 in any preferred way, as by screws 22. Through an aperture 23 in this plate protudes the end of the stud 18, which may be squared or screw-threaded in order that a thumb-piece or lever 24 may be connected therewith. I prefer to make this lever 24 in two parts, hinged as at 25, as shown in the drawings, from which it will be seen that one part is adapted to be folded over against the other, thereby affording a cover for an oil-duct 26 in the stud 18. This hinged form of lever is also desirable, as it occupies little space, and when it is straightened out it gives greater leverage.

The operation of my device is as follows: If when the bicycle is being used as a roadster the rider desires to convert it into a racer, he merely turns the thumb-piece 24 to cause the disengagement of the slides 15 with the racks 12, moves the crank-shaft bearing slightly toward the rear wheel to loosen the chain, places the chain on the smaller sprocket 3, and then moves the crank-shaft forward until the chain is sufficiently taut, when upon releasing his hold on the thumb-piece the springs 17 will cause the dogs to engage the racks 12 and the bearing will be securely locked in its new position. The reverse operation will change the racer into a roadster.

What I claim, and desire to secure by Letters Patent, is—

1. In a velocipede the combination with the driving wheel provided with sprockets of different diameters, and a driving sprocket, of means for permitting the adjustment of the driving sprocket toward and from said sprockets, said means comprising a laterally inclined guide or guides on the bicycle frame and a slide on said guide carrying said driving sprocket, substantially as and for the purposes set forth.

2. In combination with the driving wheel provided with sprockets of different diameters, and a driving sprocket, of means for permitting the adjustment of the driving sprocket both toward and from the first mentioned sprockets and laterally of the wheel, said means comprising a laterally inclined guide or guides on the bicycle frame, a crank-shaft bearing sliding on said guides, and a crank-shaft connected with the driving sprocket, substantially as and for the purposes set forth.

3. A velocipede frame provided between the front and rear wheels with laterally inclined guide rods or bars, rear forks or frame pieces 8 connected with the rear ends of said bars, a transverse bar 8ª connected with the front ends of said bars, a front frame piece or brace 9 connected with the transverse bar, a crank-shaft bearing adjustably mounted on and inclosing said guide bars, sprockets of different diameters on the driving wheel, and a driving sprocket on the crank-shaft, substantially as and for the purposes set forth.

4. The combination of a driving wheel having sprockets of different diameters, the laterally inclined bars provided with racks, a crank-shaft bearing thereon, dogs carried by the said bearing and adapted to engage with said racks to lock said bearing in different positions, and a driving sprocket carried by said bearing, substantially as and for the purposes set forth.

5. The combination of a driving wheel having sprockets of different diameters, the crank-shaft bearing, the laterally inclined racks, dogs for engaging the same, springs for keeping the dogs in engagement with the racks, and a driving sprocket carried by said bearing, substantially as and for the purpose set forth.

6. The combination with a driving wheel having sprockets of different diameters, of the laterally inclined guides having racks, dogs for engaging the same, means for simultaneously and oppositely moving the dogs toward and from the racks, and a crank shaft bearing on said guides, substantially as and for the purposes set forth.

7. The combination of a driving wheel having sprockets of different diameters, the recessed or notched laterally inclined guiding bars, and a bearing sliding thereon, dogs for engaging the bars, springs for moving the dogs in one direction, a lever having arms adapted to engage the dogs to move the latter in the other direction, and a driving sprocket carried by said bearing, substantially as and for the purposes set forth.

8. The combination with the crank-shaft bearing, the laterally inclined racks and the dogs, of the stud 18 having means for operating the dogs, the covering plate 21, means outside of said plate for operating said stud, a driving wheel having sprockets of different diameters, and a driving sprocket carried by said bearing, substantially as and for the purposes set forth.

9. In an adjustable velocipede bearing, the combination with the dogs, of the stud 18 mounted on the bearing and having the longitudinal duct 26, and the operating lever 24 on the stud 18, hinged and adapted to cover said duct, substantially as and for the purposes set forth.

In witness whereof I have hereunto signed my name in the presence of two witnesses.

JAMES E. LOWE.

Witnesses:
E. T. PENZOLD,
M. ETHERIDGE.